United States Patent [19]

Spicer

[11] Patent Number: 5,566,039
[45] Date of Patent: Oct. 15, 1996

[54] READ/WRITE HEAD POSITIONING DEVICE

[75] Inventor: Barry K. Spicer, Berthoud, Colo.

[73] Assignee: Storage Technology Corporation, Louisville, Colo.

[21] Appl. No.: 329,271

[22] Filed: Oct. 26, 1994

[51] Int. Cl.$^6$ .............................. G11B 5/55; G11B 5/56; G11B 21/10; G11B 21/12
[52] U.S. Cl. ............................................ 360/106; 360/109
[58] Field of Search ..................................... 360/106, 109

[56] References Cited

U.S. PATENT DOCUMENTS

| | | | |
|---|---|---|---|
| 4,363,046 | 12/1982 | Saito | 360/106 |
| 4,646,183 | 2/1987 | Cohen | 360/106 |
| 5,179,486 | 1/1993 | Kraemer et al. | 360/106 |
| 5,280,402 | 1/1994 | Anderson et al. | 360/106 |

*Primary Examiner*—Robert S. Tupper
*Attorney, Agent, or Firm*—Sterne, Kessler, Goldstein & Fox, P.L.L.C.

[57] ABSTRACT

A magnetic tape head positioning device for vertically displacing the magnetic head relative to the tape path. The read/write head positioning device is implemented in a tape drive system for reading and writing magnetic data on a plurality of parallel data tracks of a magnetic medium which is moving longitudinally on a tape transport path of a high performance tape path system. The read/write head positioning device includes a support body which is fixedly secured in a position which is proximate to the tape transport path. It also has a head housing configured to securely support a magnetic head such that the magnetic head may be selectively aligned with respect to the plurality of parallel data tracks. The head housing has a front face positioned across a transverse dimension of the passing magnetic medium. Coupled to the head housing is a head housing base which is fixedly attached to, and extending vertically from, a top surface of the support base. The head housing and the head housing base are parallel to each other. The head positing device also includes a pair of flexures or flat springs for stabilizing the vertical movement of the head housing in the transverse direction to the passing magnetic tape media. A first flexure or flat spring is attached to a top surface of the head housing and to a top surface of the head housing base. A second flat spring is fixedly attached to a bottom surface of the head housing and to a bottom surface of the head housing base. A means for moving the head housing in a direction transverse to the direction of the magnetic medium movement in also included in the read/write positioning device of the present invention. This may be an electromagnetic device, such as a voice coil, or a piezoelectric device. The moving device moves the magnetic head in a vertical direction such that the magnetic head can read and write data to a plurality of tracks.

9 Claims, 5 Drawing Sheets

READ/WRITE HEAD POSITIONING DEVICE

BACKGROUND OF THE INVENTION

1. Field of the Invention

This invention relates generally to the field of magnetic tape transport systems, and more particularly, to a read/write head positioning device.

2. Related Art

In the course of developing various systems for the storage of data, data processing systems have traditionally utilized magnetic tape as a data storage medium. Typically, the magnetic tape is contained in an appropriate cartridge to facilitate the handling of the magnetic tape while in use as well as to protect the tape while in storage. An example of such a magnetic tape which has found applications in both the audio recording and computer industries is the data cartridge form as defined by American National Standard Institute (ANSI) Standard X3.180-1990. This cartridge has a single supply reel of magnetic tape that has a tape leader block attached to the free end of the tape. The IBM Model 3480 tape drive ("IBM" is a registered trademark of International Business Machines Company) utilizes this cartridge. Due to the prevalence of the 3480 tape drive system in the computer and data processing industries, this magnetic tape cartridge has become known in the industry as the 3480-type cartridge.

In common tape drive systems the magnetic tape cartridge in which the magnetic media is enclosed is inserted into a tape transport system. The magnetic tape is then wound and rewound between a supply reel contained within the tape cartridge and a take-up or machine reel in the tape transport system. The tape is transported along a tape path which brings the tape into contact with, or adjacent to, a magnetic tape head located along the tape path. Magnetic tape heads used in present-day tape drive systems are multi-track tape heads having separate read and write elements associated with each data track on the magnetic tape. This enables multi-track magnetic tape heads to read and write several streams of data (one per track) simultaneously. The magnetic tape is typically guided past the read/write head by air bearings which provide an interface of forced air with the magnetic tape to lower friction forces between the tape and bearing surface.

Examples of magnetic tape drive systems which store 18 tracks of data on the half-inch magnetic tape housed in the 3480-type cartridge are the StorageTek 4480 tape drive system, available from Storage Technology Corporation, Louisville, Colo., U.S.A., and the IBM 3480 tape drive system, available from IBM Corporation, Armonk, N.Y., U.S.A. Examples of magnetic tape drives which will store 36 tracks of data on the same half-inch magnetic tape are the (not yet publicly available but soon to be released) StorageTek 4940 and 4490 tape drive systems, manufactured by Storage Technology Corporation; and the IBM 3490 tape drive system, manufactured by IBM Corporation.

Recently, there has been a great demand for increasing the data throughput of magnetic tape transport systems used in conjunction with high-speed digital computers. In order to utilize the high-speed capabilities of these computers, it is necessary to increase the amount of data stored on a magnetic tape and to increase the speed at which the data is written to or retrieved from the magnetic tape media.

Of particular relevance is the advance in magnetic tape head technology to increase the track density of the magnetic tapes. Track density is defined as the number of data tracks per unit width of magnetic tape. Two characteristics associated with track density are track width, defined as the actual width of an individual data track; and track pitch, defined as the distance from the center of one data track to the center of a neighboring data track. As magnetic tape head size decreases, the track pitch and track width of a magnetic tape is decreased, thereby increasing track density.

Recently, improvements in the ability of magnetic tapes to store data at higher track densities has exceeded advances in magnetic tape head design. To continue to improve the data throughput of tape drive systems, these incongruous advances have lead to a need to read and write data to high density magnetic tapes, such as a 72 or 144 track half-inch magnetic tape, with a magnetic tape head having a lesser number of read/write elements.

One approach is to move the magnetic tape vertically while maintaining the magnetic head in a stationary position. However, attempts at moving the magnetic tape have been found to cause unrecoverable pertebations in the tape which prevent accurate data transfer, as well as cause excessive wear and damage to the magnetic tape.

Another approach which has been considerably more successful has been to vertically displace the magnetic tape head relative to the magnetic tape while maintaining accurate control of the magnetic tape along the tape path. One conventional approach to moving the read/write head has been to mount the read/write head on a leadscrew and, typically using a servo system, adjust the position of the head relative to a passing magnetic tape. This approach is described in U.S. Pat. No. 5,179,486 to Kraemer et al.

However, this and other conventional approaches have been found to be unacceptable for achieving the title movements necessary to accurately read data from a magnetic tapes having the increased track density described above.

Another problem with conventional tape head positioning devices is the inability to accurately displace the magnetic tape head in one axis without simultaneously causing significant rotation of the head.

What is needed therefore, is a read/write tape head positioning device capable of positioning the head for accurately reading and writing data on a high-density, thin film magnetic tape at very high speeds.

SUMMARY OF THE INVENTION

The present invention is a magnetic tape head positioning device for vertically displacing the magnetic head relative to the tape path. The read/write head positioning device is implemented in a tape drive system for reading and writing magnetic data on a plurality of parallel data tracks of a magnetic medium which is moving longitudinally on a tape transport path of a high performance tape path system. The read/write head positioning device includes a support body which is fixedly secured in a position which is proximate to the tape transport path. It also has a head housing configured to securely support a magnetic head such that the magnetic head may be selectively aligned with respect to the plurality of parallel data tracks. The head housing has a front face positioned across a transverse dimension of the passing magnetic medium. Coupled to the head housing is a head housing base which is fixedly attached to, and extending vertically from, a top surface of the support base. The head housing and the head housing base are parallel to each other. The head positing device also includes a pair of flexures or flat springs for stabilizing the vertical movement of the head housing in the transverse direction to the passing magnetic tape media. A first flexure or flat spring is attached to a top surface of the head housing and to a top surface of the head housing base. A second flat spring is fixedly attached to a bottom surface of the head housing and to a bottom surface of the head housing base.

A means for moving the head housing in a direction transverse to the direction of the magnetic medium movement in also included in the read/write positioning device of the present invention. This may be an electromagnetic device, such as a voice coil, or a piezoelectric device. The moving device moves the magnetic head in a vertical direction such that the magnetic head can read and write data to a plurality of tracks.

The read/write head positing device of the present invention is implemented in a high performance tape path system. The high performance tape path system is comprised of a number of tape guidance devices which provide varying levels of control and guidance to the magnetic tape as it travels along a tape path between a supply reel and a take-up reel. The arcuate tape path has a magnetic tape head assembly at a central position. On each side of the magnetic tape head assembly are fine tape guidance devices which provide precise and accurate control of the magnetic tape. Adjacent to each of the fine tape guidance devices along the tape path are tape cleaner block assemblies which are used to clean the tape as it approaches and departs the area of the tape head. Adjacent to each of the tape cleaner block assemblies are coarse tape guidance devices which provide the initial control and guidance of the magnetic tape.

One advantage of the present invention is the ability to allow the magnetic tape head to move in a linear fashion without significant rotation.

Another advantage of the present invention is that it has a linear force/displacement relationship which is based only on the material and physical size of the flexures, enabling the system to be configured to operate in any system with any size magnetic tape and having any type of response characteristics.

Another advantage of the present invention is that, excluding head adjustment, no adjustment is necessary. The assembly is simply assembled with a few screws.

Another advantage of the present invention is the multiple use of parts, thereby reducing the manufacturing costs of the present invention.

Another advantage of the present invention is its compact design, enabling the present invention to be easily integrated into various form factor tape drive systems.

Another advantage of the present invention is that it can be used in either an open loop or closed loop approach, with or without an encoder.

Further features and advantages of the present invention as well as the structure and operation of various embodiments of the present invention are described in detail below with reference to the accompanying drawings. In the drawings, like reference numbers indicate identical or functionally similar elements. Additionally, the left-most digit of a reference number identifies the drawings in which the reference number first appears.

BRIEF DESCRIPTION OF THE FIGURES

The present invention will be described with reference to the accompanying drawings, wherein.

DETAILED DESCRIPTION OF THE PREFERRED EMBODIMENTS

I. Read/Write Head Positioning Device

Figure 1:
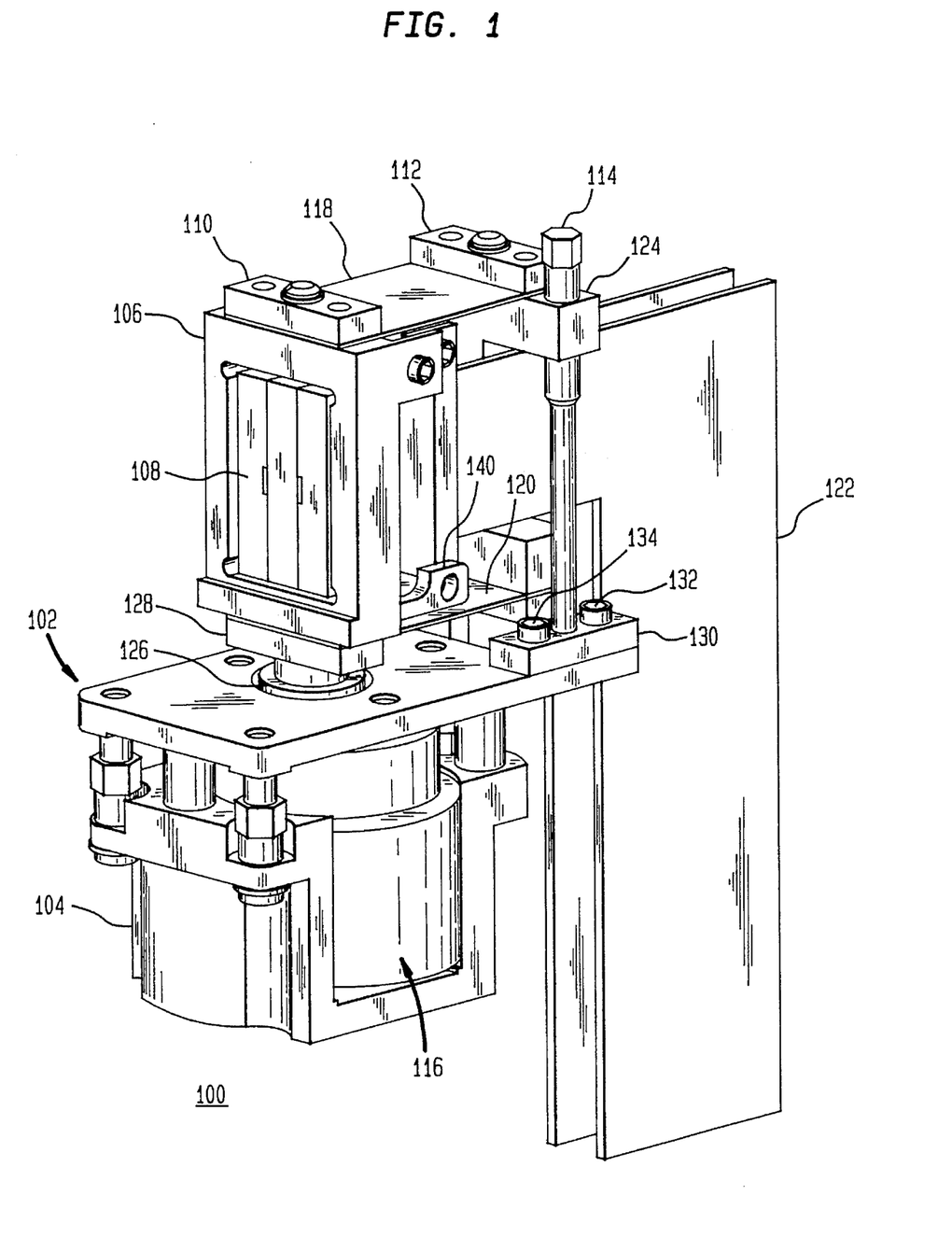
FIG. 1 is a side isometric view of the read/write head positioning device with a magnetic head and associated flex circuits installed.
Figure 2:
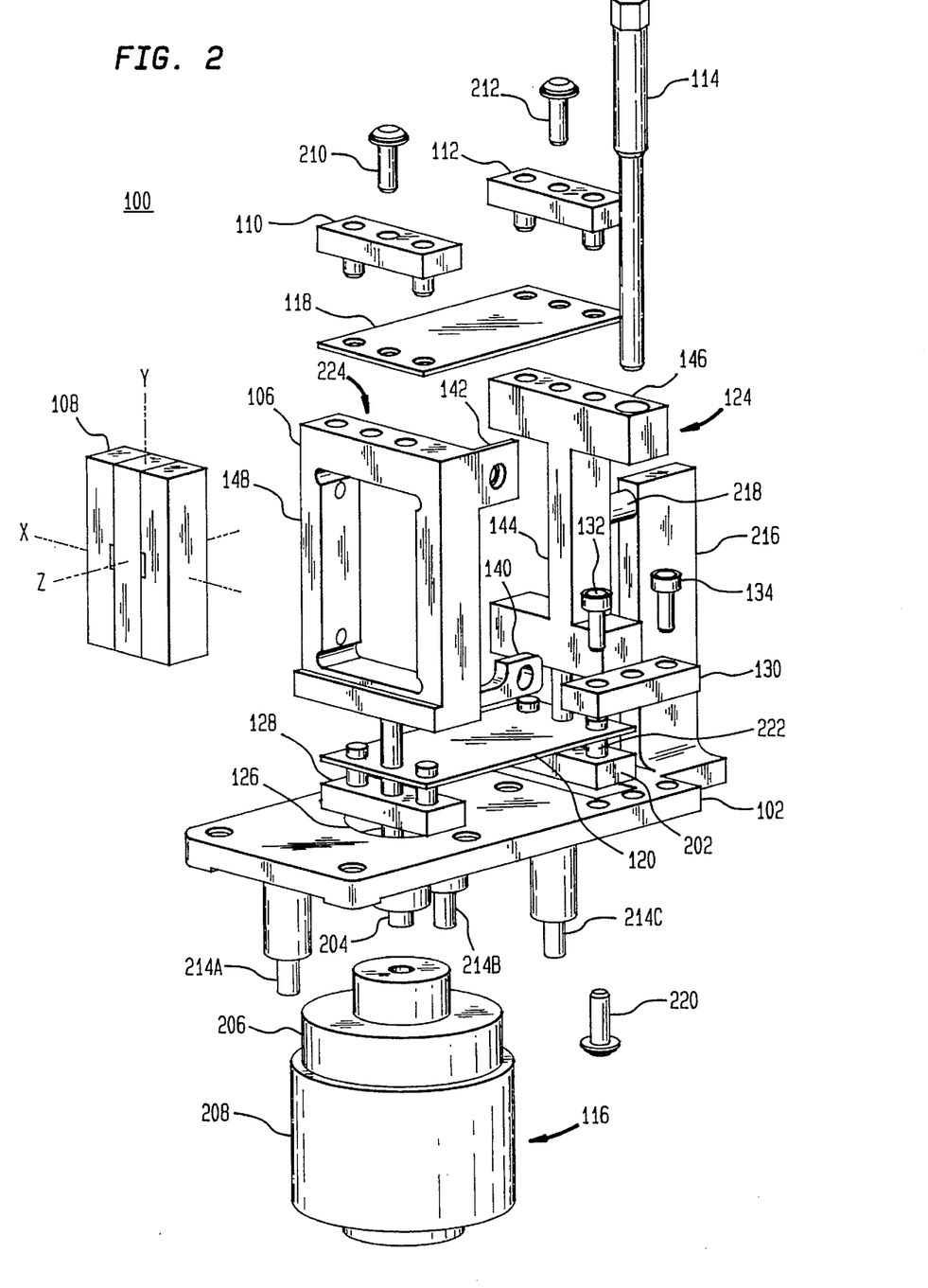
FIG. 2 is an exploded view of the read/write head positioning device.
Figure 3:
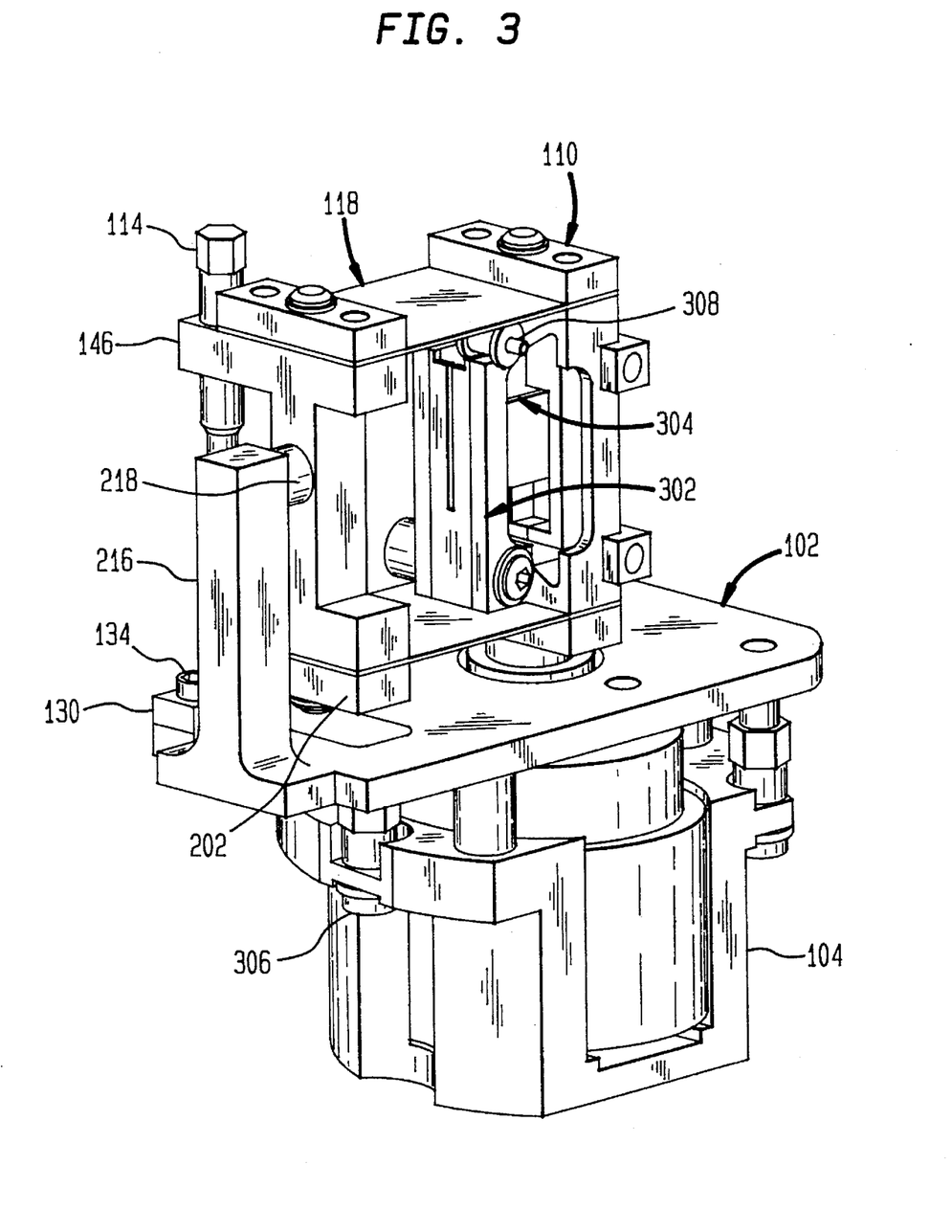
FIG. 3 is a rear perspective view of the read/write head positioning device.

FIG. 1 is a perspective view of the preferred embodiment of the read/write head positioning device of the present invention. FIG. 2 is an exploded view and FIG. 3 is a rear perspective view of the head positioning device of the present invention. Referring now to FIGS. 1 through 3, head positioning device 100 is shown with a read/write tape head 108 and associated flex circuits 122 (discussed below) installed. As will be described in detail below, head positioning device 100 is configured to be installed in a tape path system.

The read/write head positioning device 100 has a support base 102 which remains stationary during the operation of the invention. All other components of head positioning device 100 are either integral with or attached to base 102. Coupled to support base 102 is a head housing 106 and a housing base 124. Head housing 106 is configured to receive read/write head 108 and to fixedly secure read/write head 108 in a position to operate with a passing magnetic tape media. Head housing 106 is movable in the vertical direction under the control of a voice coil 116 (discussed below).

Vertical support member 216 is integral with support base 102. Vertical support member 216 extends vertically from base 102. Housing base 124 is parallel with and attached to vertical support member 216. Between head housing base 124 and vertical member 216 is a boss 218 around which head housing base 124 may be rotated. To enable such a rotation, head housing base 124 is coupled to a shaft 222 extending from the top surface of rear clamp bases plate 202. As will be described below, for head housing base 124 to rotate about boss 218, the connection of head housing base 124 with rear clamp base plate shaft 222 must be of a sufficiently small cross-sectional area to allow tilting movement to be successfully imparted upon base 124. The skew adjustment of head housing 106 and head housing base 124 is described below.

Head housing 106 is attached to a voice coil shaft 204 which extends through a through hole 126 in support base 102 to attach to a moving magnet portion 206 of voice coil 116. Voice coil 116 is supported by and attached to support base 102 via a voice coil support base 104 attached to the underside of support base 102. There are three shafts 214A, 214B, and 214C (collectively and generally referred to as shafts 214) extending from the bottom surface of support base 102. Voice coil support base 104 has corresponding receiving holes (not shown) aligned with and configured to receive shafts 214.

Coupled to voice coil shaft 204 below head housing 106 is a front base clamp plate 128. Front base clamp plate 128 is a rigid, flat supporting member, providing stability to the moving head housing 106. Rear base clamp plate 202 is of the same dimensions as, and corresponds to, front base clamp plate 128. A flat spring or lower flexure 120 is attached to the top surface of front base clamp plate 128 and rear base clamp plate 202. Flat spring 120 is attached to the surface of front base clamp plate 128 at three locations to evenly distribute the transfer of forces between plate 128 and plate 202. Flat spring 120 is attached to rear base clamp plate 202 in a similar manner.

Attached to the top surface of head housing 106 and head housing base 124 is a second flat spring or upper flexure 118. Upper flexure 118 is secured to head housing 106 by front top clamp plate 110 and screw 210. Flexure 118 is secured to head housing base 124 by rear top clamp plate 112 and screw 212. Thus, together the four components of head housing 106, upper flexure 118, head housing base 124, and lower flexure 120 form a parallelogram, with only a single side, head housing 106, not fixedly secured to base 102, moving in a vertical direction under the control of voice coil 116. This configuration provides stability to the head housing, preventing undesired tilting (rotation about the x axis), skew (rotation about the z axis), or rotation (rotation about the y axis).

To achieve proper alignment of the magnetic head 108, a skew adjust screw 114 and an associated nut plate 130 are provided with nut plate screws 132 and 134. Skew adjust screw 114 is a dual thread screw with one diameter thread coupled to a horizontal portion 146 of head housing base 124 and a second diameter thread coupled to nut plate 130. By rotating skew adjust screw 114, head housing base 124 rotates about boss 218, thereby adjusting the skew (rotation about the z axis) of head housing 106 and thus magnetic head 108. The operation of a dual thread skew adjust screw and nut plate are well known to one of ordinary skill in the art.

Magnetic head 108 is secured within head housing 106. Magnetic tape head 108 is electrically connected to a read/write pre-amplification card (not shown) through magnetic tape head cable assembly 122. Cable assembly 122 is referred to as flex circuit 122. This is because it is actually part of magnetic head assembly 108. Since flex circuit 122 is part of magnetic head 108, two 100-pin connectors which would typically be used to connect cable assembly 122 to magnetic tape head 108 have been eliminated. This reduces signal loss without interfering with the modular nature of magnetic head 108. To prevent the coupling of flex circuit 122 to magnetic head 108 from being damaged due to the movement of head housing 106, a strain relief 302 is attached to a strain relief support arm 140 extending from the rear face 224 of head housing 106. Strain relief 302 supports flex circuit 122 and transfers the vertical forces to the body of the flex circuit.

Magnetic tape head 108 receives pneumatic pressure from a pneumatic source through a tape lifter valve to lift a passing magnetic tape away from magnetic tape head 108 when the magnetic tape is stopped or is being fast-forwarded or rewound from a take-up reel back to a supply reel. The tape lifter valve controls the pneumatic pressure which is applied to the magnetic tape through the magnetic tape head to control tape flight over magnetic tape head 108. The tape lifter valve is pneumatically coupled to the magnetic tape head assembly 108 through a tape lifter valve pneumatic fitting 308 attached to pneumatic fitting support arm 142 of head housing 106. Pneumatic control is channeled from port 308 through tape lifter flat tube 304 to magnetic head 108.

The voice coil 116 is comprised of a voice coil magnet 206 and a coil 208. Voice coil 116 responds to electrical input signals to drive head housing 106 to a certain position. The control of a voice coil such as voice coil 116 is considered to be well known to one of ordinary skill in the relevant art. Although in the preferred embodiment of the present invention, the means for moving head housing 106 is a voice coil, as one skilled in the relevant art would find apparent, other types of electromagnetic devices may be used. In addition, piezoelectric devices may also be used in lieu of voice coil 116.

As discussed above, data is stored on an 18-track magnetic tape at a track pitch of approximately 630 μm and a track width of approximately 540 μm. Data is stored on a 36-track magnetic tape has a track pitch of approximately 315 μm and a track width of approximately 285 μm. The track width of the 36-track tape is approximately half the track width of the 18-track tape. Also, the distance between data tracks on the 36-track tape is approximately a third of the distance between the data tracks on the 18-track tape.

In the preferred embodiment of the present invention, magnetic head 108 is a 18 track magnetic head. This gives the present invention the characteristic of being backward compatible. That is, the present invention is capable of reading and writing data to an 18 and 36 track half-inch magnetic tape as well as higher density half-inch magnetic tapes having of 72, 144, and more tracks. In the preferred embodiment of the present invention, an 18 track magnetic tape head 108 is positioned at the center of a passing 144 track half-inch magnetic tape. The track pitch of a 144 track tape is approximately 0.0031 inches. Since magnetic head 108 is an 18 track interleaved magnetic head, the maximum distance magnetic head 108 is required to be displaced a maximum of 0.0124 inches in an upward vertical direction or a downward vertical direction. The read/write head positioning device of the present invention is capable of dynamically moving magnetic tape head 108 while maintaining strict tolerances.

For example, despite the fact that the maximum distance magnetic head 108 is required to be displaced a maximum of 0.0124 inches, the read/write head positioning device of the present invention has been tested at vertical displacements of 0.020 inches. The magnetic head experienced a tilting (rotation about the x axis) of 0.00034 inches; a rotation (rotation about the y axis) of 0.0000015 inches; and no skew (rotation about the z axis).

II. Tape Path System Architecture

Figure 4:
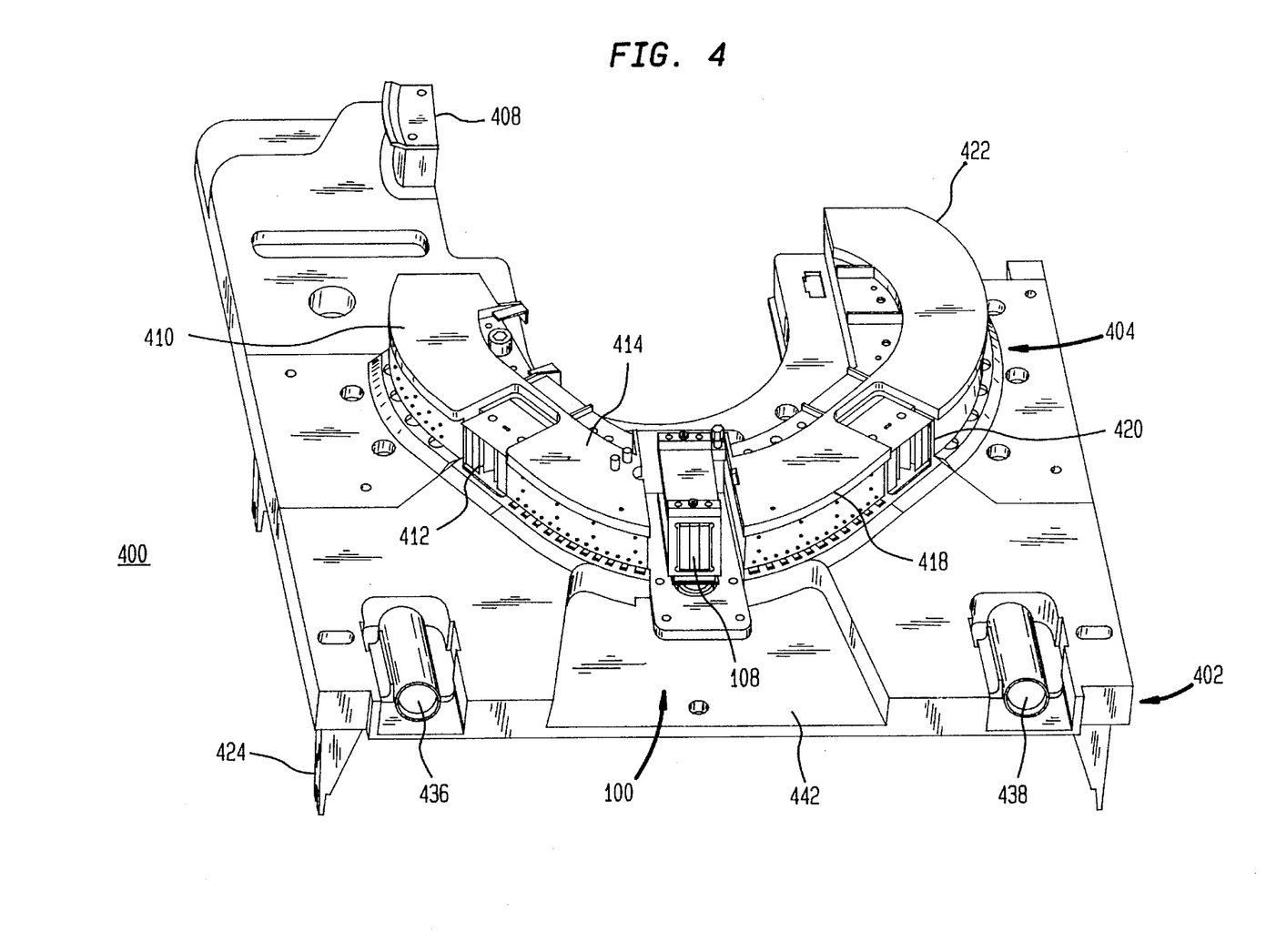
FIG. 4 is a top perspective view of a high performance tape path system including the read/write head positioning device.

FIG. 4 illustrates a top perspective view of a high performance tape path system 400 in which the read/write head of the present invention is implemented. Referring now to FIG. 4, the major components of tape path system 400 are now discussed. All components relating to high performance tape path system 400 are integral with, mounted on, or attached to, a read/write sub-deck 402. Mechanically coupled to sub-deck 402 via support columns 424 is a read/write pre-amplification card (not shown) which is electrically connected to the components on sub-deck 402 (discussed below).

In the preferred embodiment, there are eight major components of tape path system 400 which guide and control the magnetic tape as it travels along a tape path 404. Following tape path 404, the first component of tape path system 400 that the magnetic tape interfaces with is an initial tape guidance device 408. The magnetic tape then continues to travel along tape path 404 until it comes under the control of a coarse tape guidance device 410. The magnetic tape is then cleaned by a tape cleaner assembly 412. Lastly, the magnetic tape passes a fine tape guidance device 414. Coarse tape guidance device 410 and fine tape guidance device 414 provide increasing control over the movement of the magnetic tape as it travels along tape transport path 404 from the supply reel to the magnetic tape head 108 located in read/write head positioning device 100. This enables tape path system 400 to achieve the necessary accuracy of tape movement control of the magnetic tape as it passes over magnetic tape head 108.

Components which are functionally similar to coarse tape guidance device 410, tape cleaner assembly 412, and fine tape guidance device 414 are located on the opposite side of magnetic tape head 108. These include a fine tape guidance device 418, a tape cleaner assembly 420, and a coarse tape guidance device 422. This side of tape path system 400 is referred to as the take-up reel side since the magnetic tape is transferred between a take-up reel and magnetic tape head 108. The opposite side of tape path system 400 is referred to as the supply reel side since the magnetic tape is transferred between a supply reel located within a magnetic tape cartridge 103 and magnetic tape head 108. This mirror image configuration of components on the supply reel and take-up reel sides enables tape path system 400 to optimally transfer data between magnetic head 108 and magnetic tape medium 501 when magnetic tape medium 501 travels in both directions.

In the high performance tape path system 400 of the present invention, the magnetic tape is primarily controlled by the five tape guidance devices introduced above: initial tape guidance device 408, coarse tape guidance device 410, fine tape guidance device 414, fine tape guidance device 418, and coarse tape guidance device 422. As will be discussed below, these tape guidance devices have different configurations and perform different functions to control the movement of the magnetic tape as it travels through high performance tape path system 40.0. These different configurations and functions are dependent upon the location of the tape guidance device along the tape path in high performance tape path system 400. All five tape guidance devices contain air bearings which provide a cushion of air on which the magnetic tape travels.

The read/write sub-deck 402 has raised platforms on which the pneumatic tape guidance devices are mounted. The pneumatic tape guidance devices receive pneumatic pressure and/or vacuum from pneumatic source(s) through a pneumatic distribution system. This pneumatic pressure/vacuum is fed through the bottom surface of read/write sub-deck 402 to supply ports on the top surface of the sub-deck 402 on the associated raised platforms.

The five pneumatic tape guidance devices fall into three categories according to the function that they perform. The first category of tape guidance devices have, as their primary function, the traverse or radial positioning of the magnetic tape as it travels along tape path 404. This first category of tape guidance devices includes initial tape guidance device 408. Initial tape guidance device 408 performs the initial traverse positioning of the magnetic tape as it leaves the supply reel and begins to travel along tape path 404.

The second category of tape guidance devices have as their primary function the initial lateral stabilization of the magnetic tape as it begins its travel along tape path 404. This second category of tape guidance devices includes coarse tape guidance device 410 and coarse tape guidance device 422. Coarse tape guidance device 410 performs the initial lateral stabilization of the magnetic tape as it comes from supply reel 502. Coarse tape guidance device 422 performs the initial lateral stabilization of the magnetic tape as it comes from take-up reel 504.

The third category of tape guidance devices have as their primary function the accurate and precise lateral and transverse guidance and control of the magnetic tape for proper alignment with the magnetic tape head 416. This category of tape guidance devices includes fine tape guidance device 414 and fine tape guidance device 418. Fine tape guidance devices 214 and 218 are required to provide the most accurate guidance and control of the magnetic tape since they are located closest to the magnetic tape head 108. Each of these pneumatic tape guidance devices is discussed below in accordance with the above categories.

Referring to FIG. 4, the fine tape guidance devices form an arcuate tape path 404 which extends from a point proximate to supply reel 502 to a point proximate to take-up reel 504. The curvature of tape path 404 enables the high performance tape path system 400 to provide a smooth, continuous movement to the magnetic tape as it travels along tape path 404 while providing a minimum amount of air pressure to maintain tape flight between the magnetic tape and air bearings.

Referring to FIG. 4, fine tape guidance devices 414 and 418 are positioned on each side of read/write head positioning device 100. These fine tape guidance devices accurately guide and control the magnetic tape to prevent lateral movement of the magnetic tape as it passes magnetic tape head 108. This enables high performance tape path system 400 to support read/write head positing device with an 18 track tape head capable of writing data to a magnetic tape having a track density of 72 data tracks per half-inch tape.

Referring to FIG. 4, high performance tape path system 400 includes two tape cleaner assemblies 412 and 420. Tape cleaner assembly 412 is positioned on the supply reel side of high performance tape path system 400. Likewise, tape cleaner assembly 420 is positioned on the take-up reel side of high performance tape path system 400. Tape cleaner assemblies 412 and 420 are positioned as close as possible to read/write head positioning device 100 without sacrificing the benefits of providing guidance proximate to magnetic tape head 108. This enables high performance tape path system 400 to provide accurate control of the magnetic tape while achieving certain benefits with tape cleaner assemblies.

A tape tension transducer (not shown) is typically coupled to coarse tape guidance device 410. The use of a pressure transducer to determine tape tension in a tape transport system is known in the art. Typically, the magnetic tape is passed around an arcuate surface defined by an air bearing which provides a gaseous cushion between the magnetic tape and the arcuate surface. Air is typically used to create the gaseous cushion, however, any other type of gaseous material suitable for a given application may be used. The tape tension transducer is coupled to a sense port to determine the pressure between the magnetic tape and any air-bearing arcuate surface. Since the tape tension is directly proportional to the pressure measured at the sense port, the tension of the magnetic tape can be readily determined.

The tape threading mechanism which utilizes the outputs of tape tension transducer 234 is described in the commonly owned U.S. Pat. No. 5,219,129 to Spicer et al., entitled "Tape Threading Mechanism," herein incorporated by reference in its entirety.

Two pneumatic fittings 436 and 438 are used to interface high performance tape path system 400 with a vacuum source and a pressure source, respectively.

Figure 5:
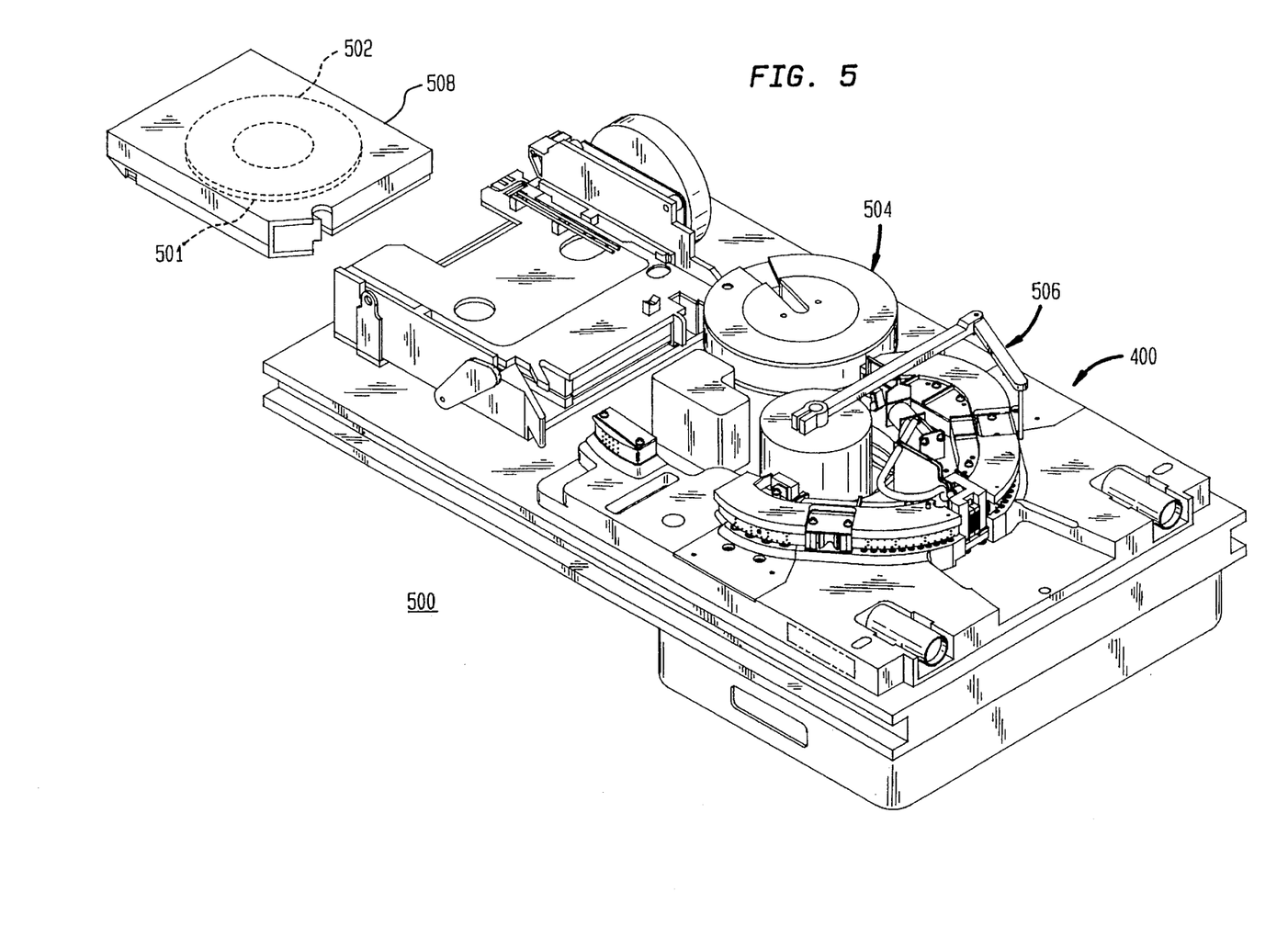
FIG. 5 is a top perspective view of a tape transport system main deck illustrating the location of the major components, including a high performance tape path system wherein the read/write head positioning device of the present invention is implemented.

FIG. 5 illustrates a top perspective view of a tape transport 500 illustrating the relative position of the major components of the tape transport, including high-performance tape path system 400. FIG. 5 further illustrates the position of tape path system 400 relative to a tape threading arm 506, a supply reel 502 located in a magnetic tape cartridge 503, and a machine or take-up reel 504. When a magnetic tape is inserted into tape transport 500, tape threading mechanism 506 attaches to a leader block of the magnetic tape cartridge and threads the magnetic tape in an arcuate path around high-performance tape path system 400 to take-up reel 504.

The high performance tape path system is further described in commonly owned U.S. patent application entitled "High Performance Tape Path System," serial number 08/170,916, filed on Dec. 21, 1993, incorporated herein by reference in its entirety.

While the invention has been particularly shown and described with reference to preferred embodiments thereof, it will be understood by those skilled in the relevant art that various changes in form and detail may be made therein without departing from the spirit and scope of the invention.

What is claimed is:

1. In a tape drive system for magnetic recording and playback of data on a plurality of parallel tracks of a record medium moving longitudinally on a transport path past a read/write head, a read/write head positioning device operable to selectively align the read/write head with respect to each of the record tracks, the read/write head positioning device comprising:

a support base;

a vertical support member extending substantially perpendicularly from said support base;

a housing base attached to said vertical support member by a boss, wherein said housing base is attached to said vertical support member so as to be spaced apart from and substantially in parallel with said vertical support member, wherein said housing base is rotatable around said boss;

skew adjustment means coupled with said housing base and said support base for imparting a rotational movement on said housing base, thereby rotating said housing base around said boss when said skew adjustment means is adjusted;

a head housing attached to said housing base by a pair of flexures; and moving means coupled with said head housing for moving said head housing along an axis substantially perpendicular to said support base.

2. The read/write head positioning device of claim 1, wherein said moving means is a voice coil having a stationary coil portion and a moving magnet portion, wherein said head housing is fixedly coupled to said moving magnet portion of said voice coil.

3. The read/write head positioning device of claim 1, further comprising:

a read/write head positioned in said head housing, wherein said head housing is disposed substantially perpendicular to said support base.

4. The read/write head positioning device of claim 3, further comprising:

a flex circuit connected to said read/write head.

5. The read/write head positioning device of claim 1, wherein said skew adjustment means comprises:

an adjustable nut place coupled to said support base; and a skew adjust screw configured to operate with said head housing base and said adjustable nut plate.

6. The read/write head positioning device of claim 3, wherein said read/write head is an 18 track read/write tape head and further wherein said record medium is a 144 track record medium.

7. In a tape drive system for reading and writing magnetic data on a plurality of parallel data tracks of a magnetic medium which is moving longitudinally on a tape transport path of a high performance tape path system, a read/write head positioning device comprising:

a support base;

a vertical support member extending substantially perpendicularly from said support base;

a housing base attached to said vertical support member by a boss, wherein said housing base is attached to said vertical support member so as to be spaced apart from and substantially in parallel with said vertical support member, wherein said housing base is rotatable around said boss;

a skew adjustment means coupled with said housing base and said support base for imparting a rotational movement on said housing base, thereby rotating said housing base around said boss when said skew adjustment means is adjusted;

a head housing:

a first flat spring fixedly attached to a top surface of said head housing and to a top surface of said housing base;

a second flat spring fixedly attached to a bottom surface of said housing and to a bottom surface of said housing base;

moving means coupled with said head housing for moving said head housing along an axis substantially perpendicular to said support base, wherein said first and second flat springs flexibly secure said head housing to said housing base, thereby enabling said head housing to move only in said vertical direction when said moving means acts on said head housing.

8. The magnetic head positioning device of claim 7, wherein said moving means is an electromagnetic device, responsive to an electrical control input.

9. The read/write head positioning device of claim 7, wherein said skew adjustment means comprises:

an adjustable nut place coupled to said support base; and a skew adjust screw configured to operate with said head housing base and said adjustable nut plate.

\* \* \* \* \*